United States Patent
Bayles

(10) Patent No.: US 7,039,697 B2
(45) Date of Patent: May 2, 2006

(54) REGISTRY-INTEGRATED INTERNET DOMAIN NAME ACQUISITION SYSTEM

(75) Inventor: Len Albert Bayles, Salt Lake City, UT (US)

(73) Assignee: SnapNames.com Inc., Portland, OR (US)

( * ) Notice: Subject to any disclaimer, the term of this patent is extended or adjusted under 35 U.S.C. 154(b) by 549 days.

(21) Appl. No.: 10/016,498

(22) Filed: Nov. 1, 2001

(65) Prior Publication Data

US 2002/0091703 A1   Jul. 11, 2002

Related U.S. Application Data

(60) Provisional application No. 60/245,102, filed on Nov. 1, 2000, provisional application No. 60/248,341, filed on Nov. 13, 2000.

(51) Int. Cl.
*G06F 15/173* (2006.01)
(52) U.S. Cl. .................................................. 709/223
(58) Field of Classification Search ................ 709/203, 709/223–225, 228; 707/1, 3, 10, 100, 200
See application file for complete search history.

(56) References Cited

U.S. PATENT DOCUMENTS

| | | | |
|---|---|---|---|
| 5,764,906 A | 6/1998 | Edelstein et al. | 395/200.49 |
| 5,987,464 A | 11/1999 | Schneider | 707/10 |
| 5,999,915 A | 12/1999 | Nahan et al. | 705/27 |
| 6,009,459 A | 12/1999 | Belfiore et al. | 709/203 |
| 6,016,512 A | 1/2000 | Huitema | 709/245 |
| 6,249,767 B1 | 6/2001 | Okayama et al. | 705/5 |
| 6,298,341 B1* | 10/2001 | Mann et al. | 707/3 |
| 6,314,469 B1* | 11/2001 | Tan et al. | 709/245 |
| 6,338,082 B1* | 1/2002 | Schneider | 709/203 |
| 6,442,549 B1* | 8/2002 | Schneider | 707/10 |
| 6,446,133 B1* | 9/2002 | Tan et al. | 709/245 |
| 6,519,589 B1 | 2/2003 | Mann et al. | 707/3 |
| 6,560,634 B1* | 5/2003 | Broadhurst | 709/203 |
| 6,678,717 B1* | 1/2004 | Schneider | 709/203 |
| 6,760,746 B1 | 7/2004 | Schneider | 709/203 |
| 6,868,441 B1* | 3/2005 | Greene et al. | 709/220 |
| 6,880,007 B1* | 4/2005 | Gardos et al. | 709/225 |

(Continued)

FOREIGN PATENT DOCUMENTS

WO    WO 99/09726    2/1999

(Continued)

OTHER PUBLICATIONS

PCT International Search Report dated Apr. 16, 2002, for International Application No. PCT/US01/48054.

(Continued)

*Primary Examiner*—Marc D. Thompson
*Assistant Examiner*—J. Bret Dennison
(74) *Attorney, Agent, or Firm*—Stoel Rives LLP

(57) ABSTRACT

A preferred embodiment of the present invention integrates a domain name monitoring and acquisition service with a registry system. The monitoring and acquisition service can receive a request from a registrar to acquire a domain name. The monitoring and acquisition service also can receive a pending delete notification from the registry for a domain name having a registration that is about to be deleted. The pending delete notification can be received before the registry issues a public delete notification or purges the domain name, at which point the domain name is registrable by the first-responding registrar. If the domain name that is the subject of the pending delete notification has a corresponding acquisition request received by the monitoring and acquisition service, the monitoring and acquisition service can request acquisition of the domain name for the requesting registrar.

20 Claims, 4 Drawing Sheets

U.S. PATENT DOCUMENTS

| | | | |
|---|---|---|---|
| 2001/0037253 A1 | 11/2001 | Kensey | 705/26 |
| 2002/0010767 A1 | 1/2002 | Farrow et al. | 709/223 |
| 2002/0010795 A1 | 1/2002 | Brown | 709/245 |
| 2002/0019800 A1 | 2/2002 | Shuster | 705/37 |
| 2002/0042693 A1 | 4/2002 | Kampe et al. | 702/186 |
| 2002/0065903 A1 | 5/2002 | Fellman | 709/220 |
| 2002/0091827 A1 | 7/2002 | King et al. | 709/226 |
| 2003/0225670 A1 | 12/2003 | DeCarlo, III | 705/37 |
| 2004/0098375 A1 | 5/2004 | DeCarlo, III | 707/3 |
| 2004/0172463 A1* | 9/2004 | King et al. | 709/223 |

FOREIGN PATENT DOCUMENTS

| | | |
|---|---|---|
| WO | WO 01/17192 A2 | 3/2001 |
| WO | WO 01/22286 A1 | 3/2001 |
| WO | WO 01/97486 A2 | 12/2001 |

OTHER PUBLICATIONS

VeriSign, "The Extensible Provisioning Protocol—XML Trust Services," White Paper, 2000, 6 pages, Mountain View, California.

PCT International Search Report dated Aug. 21, 2002 for International Application No. PCT/US01/47967.

DomainNICnames.com, about page, Your Domain Name Resource Center, Copyright 1998-2000, published on the Internet at <http://www.domainnicnames.com/aboutus.html>.

Inc.com, "Acquire an Expired Domain Name," published on the Internet Jun., 2001 at http://www.inc.com/articles/2001/06/22592.html.

Domain Name Guide, "Goldrush Domain Name News, Links & Information Since 1996," published on the Internet at http://www.igoldrush.com/expired.htm. Copyright Internet Goldrush 1996-2003.

Domain Mart: Domain Name Brokers, Escrow and Registration, published on the Internet at http://www.domainmart.com/tools/us.htm. Creation date Jul. 11, 1996.

Domains Bot, "Welcome to DomainsBot," published on the Internet at http://www.domainsbot.com. Creation date Jun. 7, 2000.

Domains Bot, "My Watch List," published on the Internet at http://www.domainsbot.com/services/se/wl.aspx.

Expired Domain Names, published on the Internet at http://www.eyeondomain,com/expired_domain_names.html. Creation date Jul. 28, 2000.

ExpireFish.com, "How Does Expirefish.com Work?" Published on the Internet at http://www.expirefish.com/scripts/index.php, Creation date Sep. 6, 2000.

* cited by examiner

REGISTRY-INTEGRATED INTERNET DOMAIN NAME ACQUISITION SYSTEM

RELATED APPLICATIONS

This application is a continuation of and claims priority from U.S. Provisional Patent Application No. 60/245,102, filed Nov. 1, 2000, and U.S. Provisional Patent Application No. 60/248,341, filed Nov. 13, 2000.

COPYRIGHT NOTICE

© 2001 SnapNames.com, Inc. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR § 1.71(d) –(e) (2000).

TECHNICAL FIELD

This invention pertains to distributed computer network node naming resolution processes and, more specifically, to registration of Internet domain names.

BACKGROUND OF THE INVENTION

In distributed computer networks, being able to locate individual computers, servers, or various other machines on the network is critical. On the Internet, one of the most valuable identification resources is the domain name. Internet domain names provide a convenient way to reference Internet Protocol (IP) numerical addresses. Presently, IP addresses are 32-bit integers. They comprise four numbers separated by periods. Every "host" machine (e.g., computer, etc.) connected to the Internet must be identifiable by a specific numerical IP address. However, people prefer to reference host machines by pronounceable, easily remembered names, referred to as "domain names." The Internet implements a Domain Name System (DNS) to facilitate matching specific domain names to specific hosts.

The DNS is a distributed database system that allows computer applications to map between domain names and IP addresses. The DNS also provides electronic mail routing information and many other services. Individual components of the DNS distributed database can be cached locally, or stored on any of numerous distributed machines. The DNS database data correlates each domain name to a specific numeric IP address. If a computer's local cache does not have the information to resolve a domain name into an IP address, it sends a request to other computers that may contain the resolution information. The DNS affords a domain name some measure of independence from the physical location of a host. The host can be moved to a new location on the network, but it can still be accessed using the same domain name. As long as a user can remember the domain name, the host can always be located, even if the IP address changes over time. This illustrates the value of a domain name that is easy to remember.

Physically, the DNS comprises many servers and other computers or machines that run software and store data permitting computers to query the DNS database. One such machine is the "root server." A root server is a server computer that maintains the software and data necessary to locate "name servers" that contain authoritative data for a specific domain, such as the ".com" top level domain. There are presently thirteen root servers throughout the world. Name servers are computers that have the software and data to resolve the domain name into an IP address. The data accessible through the name server is often referred to as a "zone file." A "zone" is a subset of the total domain name space. The domain names in that subset are stored in the zone file for that name server. There is a zone file for each domain space (i.e., zone).

The DNS is organized in a hierarchical, tree structure. A domain name is the label representing a specific domain within the total possible domain space available in the DNS. The highest level in the DNS hierarchy is the "root," which is technically unnamed but often referred to as the "." or "dot." The level immediately below the root in the DNS hierarchy is the top-level domain, or "TLD." It is called the "top-level domain" because it is the highest level in the hierarchy after the root. The TLD appears furthest to the right in an English-language domain name. For example, "gov" in the "uspto.gov" domain name. There are various types of TLDs. The term "gTLD" is often interchangeably used to refer to a "global top-level domain" or a "generic top-level domain." A global TLD is one that can be registered by an entity regardless of the entity's geographic location or political boundary. For example, a person, corporation, or other entity located anywhere in the world can register a name in the ".com" domain. However, because an entity must have a presence in the United Kingdom to register a name in the ".uk" TLD, that domain is not a global TLD. Similarly, a generic TLD represents a domain in which an entity can register a name regardless of what type of entity it is. For example, because any entity can register a name in the ".com" domain, while only military entities can register a name in the ".mil" domain, the ".com" domain is an example of a generic TLD and the ".mil" domain is an example of a "specific TLD." The ".uk" domain is also an example of a "country code" TLD, or "ccTLD," applicable to the United Kingdom. Other examples of ccTLDs include ".fr" for France, ".ca" for Canada, ".jp" for Japan, and ".us" for the United States of America.

By registering a domain name in a particular TLD, the TLD is sub-divided into lower levels in the DNS hierarchy. A second-level domain (SLD) is the level in the DNS hierarchy immediately below the TLD. An example of a second-level domain would be "snapnames" in the "snapnames.com" domain name. The level in the DNS hierarchy immediately below the second-level domain is the third-level domain. An example of the third-level domain would be "portland" in the "portland.or.us" domain name. Further subdivisions can be created in a similar manner. Domain names at each level of the hierarchy must be unique. Thus, while there can be only one "snapnames" registered in the ".com" TLD, there can be a "snapnames.net" domain name in addition to the "snapnames.com" domain name.

Historically, domain name registration has been conducted through a Shared Registration System (SRS) involving registries, registrars, and registrants. The SRS was created by Network Solutions, Inc. in 1999 to provide a registry backend through which multiple, globally diverse registrars could register domain names. The term "registry" refers to the entity responsible for managing allocation of domain names within a particular name space, such as a TLD. One example of a registry is the VeriSign registry for the .com, .org, and .edu TLDs. The term "registrar" refers to any one of several entities with authority to issue commands or requests to add, edit, or delete registrations to or from the registry for a name space. Entities that wish to register a domain name do so through a registrar. The term "registrant" refers to the entity registering the domain name. In some name spaces, the registry and registrar functions can be performed by the same entity. The combined registry-registrar model is implemented in many ccTLDs. The overall registration system, including multiple registries, is overseen by the Internet Corporation for Assigned Names and Numbers (ICANN). ICANN is a non-profit corporation that was formed to assume responsibility for the IP address space allocation, protocol parameter assignment, domain name system management, and root server system management functions previously performed under U.S. Government contract by the Internet Assigned Numbers Authority (IANA) and other entities.

Domain names, or more specifically domain name registrations, have become significant business (and personal) assets. Registration rights are now bought, sold, traded, bartered, auctioned and stockpiled in "inventories." Some domain names have been transferred for consideration on the order of tens or even hundreds of thousands of U.S. dollars. At the time of this writing, Verisign, Inc.—the company that maintains the .com, .net, and org gTLD registry—reports over 32 million registrations in its database. Industry statistics indicate, however, that only about 10% of the domain names registered are currently in actual use, including more than just a simple holding or redirection page. Many registrations are the work of speculators.

The actual cost to register an available domain name at present is relatively nominal, ranging from $6.50 to $35 per year. This charge is assessed by the domain name registrar to attend to entering the registration on the registry, and to maintain corresponding records. It represents a markup over the wholesale fee charged by the registry. There are numerous qualified registrars for the common gTLDs, so the market for this service is competitive. The registrar business can be viable because it can be largely automated and operated through a Web site so that direct costs are low. Volume is key, however, so much effort and money is spent on advertising and various relationships with other sites to attract "traffic." The leading registrars today each process on the order of a few million registrations or renewals per year.

New gTLDs are being added as the older ones—.com .net org—become saturated. The realm of possible names under a given gTLD is not the problem, it is immense. (Names up to 67 characters long, plus the extension, apparently can be registered today.) The trouble is that popular, easy to remember or easy to recognize names are relatively limited in number. Many of the most desirable domain names, those corresponding to well-known trademarks or generically describing commercial goods or services, are long since taken in the basic gTLD spaces.

Acquisition of a desirable domain name requires current information as the registry is changing constantly. Each registry operator disseminates updates to the corresponding domain name resolution servers around the world on at least a daily basis. One can expect this update frequency to rise toward substantially continuous. The public can access the registry directly in a "read only" fashion; in other words, the public can view information but not change it. Presently, this ability is generally implemented by the registry maintaining a public Web site (or ftp site) where anyone can get information. The WHOIS lookup, or similar functions provided by the Registry or individual registrars, can be used to identify the registrant of a given domain name. Various sites now offer these kinds of lookups, though they merely query the actual registries and/or registrar databases to acquire the data.

The challenge arises in that many users or entities are "watching" for availability of the very same names at the very same registries. The "winner" is the registrar (or individual scripting through the registrar's connections to the registry) who can "grab" (register) the newly released name before anyone else. It may have substantial resale value. Indeed, the registrar likely already has a buyer in the queue to whom to register the domain name. In any event, grabbing the name is a high-tech race where only first place wins. It is considered common knowledge in the industry that the winners are nearly always technologically sophisticated professional speculators, who either script through a registrar's connections without the registrar's knowledge, or strike arrangements with registrars for preferential access. It is also axiomatic that the average domain buyer has practically no chance of registering a valuable deleting name, a state of affairs the present invention would remedy.

To effect a registration (renewal), domain name registrants or users must work through a qualified registrar; registrants do not have direct access to the registry (except a read-only lookup or search.) In large part, this is due to the implementation of an SRS, or Shared Registration System. There is only one registry for each gTLD, as domain names must be unique globally. Each registrar qualified to service a particular gTLD has electronic access—typically a secure digital communication channel—for interacting with the corresponding registry, for example to enter or purge a domain name registration. A registration is purged, for example, if the registrant does not timely pay a renewal fee (after a grace period).

The link between a registrar and the registry employs a Registry—Registrar Protocol (RRP), a commercial example of which is the Verisign Global Registry RRP. This link into the registry is how registrars monitor the status of registered names. Various protocols can be used, one example being the Verisign EPP (Extensible Provisioning Protocol), which is an XML implementation for domain name related queries. As known to those of skill in the art, suitable alternative or future protocols could be employed.

The registry operator is contractually obligated to give all registrars equal access. For example, the ICANN (Unsponsored TLD) Registry Agreement provides in pertinent part: "Registry Operator shall provide all ICANN-Accredited Registrars that have Registry-Registrar Agreements in effect, and that are in compliance with the terms of such agreements, equivalent access to Registry Operator's Registry Services, including to its shared registration system." The complete contract can be found at: http://www.icann.org/tlds/agreements/unsponsored/registry-agmt-11may01.htm.

Because many registrars each have a high-speed, efficient communication link to the registry, and assuming each employs an efficient communication protocol, the winner of the name-grab race is still basically left to chance. To be reliably successful at acquiring domain names, a registrar needs a way to get ahead of its competitors.

SUMMARY OF THE INVENTION

One basic underlying aspect of the present invention employs a domain name "monitor and acquire" method. That method involves monitoring the databases to "watch" selected domain names, with enhanced frequency of "pinging" as the expirations draw near. This is done by pinging the WHOIS database at the registry that administers the TLD in which the domain names are registered.

Second, considerable improvement is achieved over the basic monitor and acquire method by "partnering" (actually a contractual relationship) with one, or preferably, multiple registrars, and employing all or a portion of their direct registry access bandwidth. The aggregate effect of multiple connections to the registry should improve performance in terms of timeliness of information and efficacy of any acquisition efforts, toward the goal of obtaining information on deleting (and therefore available, or soon to be available) domain names ahead of competing registrars or the would-be registrants using their registry connection.

A third, and quite different, model is this: the monitor and acquire service is integrated into the registry itself, with the cooperation of the registry operator. While the singular form of "registry" is used herein for clarity of explanation, the invention is equally applicable to multiple registries.

Implementation is simplified and efficiency is improved by integrating the monitor and acquire services directly at the registry of interest. This obviates the need for multiple registrars (or other registration service providers) to constantly "ping" the authoritative database so that loading on the system is relieved. Registrars and other retail-level competitors can avoid the trouble and expense, and especially uncertainty, of the present race-to-grab a name. For example, some of these retail-level players offer a "money back guarantee" to their customers; triggered if the retailer fails to register the desired name when it becomes available (usually because a competitor registered it first).

According to the present invention, any and all domain name retailers, such as existing registrars, can participate much more simply in providing monitor and acquire domain name services. The retailer can still offer such services to its customers under the new model, generally through its Web site. Customers can sign up to have the status of a desired name monitored and the name acquired or re-acquired automatically. The retailer no longer needs to perform the monitoring and acquiring steps itself. Rather, the retailer is acting like a reseller of these services. The services are actually provided by a single (i.e., only one is permitted per registry) intermediary entity or software routine implemented at the registry. The intermediary, or the registry implementing software consistent with the present invention, maintains databases of all domain names for which any "retailer" requests monitoring or acquisition on behalf of its customers; together with information identifying the customer.

According to another aspect of the invention, the intermediary or implemented software "watches" the registry to detect availability of a desired name and register the domain name immediately upon it becoming available. The "watching" can be effected various ways, for example through "push" updates from the registry or "pull" queries into the registry database from the intermediary.

When a desired name becomes available, it is automatically acquired by placing a hold or immediately registering the name to the customer entity listed in the database. The customer and or the associated retailer are then notified. Payment for the registration is prearranged so it too can occur immediately and automatically. This invention obviates the expensive race now going on to acquire recently available domain names. If an intermediary is involved, the intermediary will always effect the registration, as it has no direct competition and in any event gets notification ahead of others because of its direct communication link into the registry (which may be effected on the same machine as the registry).

One embodiment of the present invention can be directed to providing monitoring and acquisition services for receiving from a registrar a request to acquire a desired domain name, receiving from a registry a pending delete notification for the desired domain name (the pending delete notification preceding a public delete notification) and requesting acquisition of the desired domain name for the registrar. One embodiment of a system designed to provide these and similar services can include an acquisition database containing an acquisition request from a specific registrar to acquire a registered domain name as soon as practicable. An acquisition front end system can be provided to receive the acquisition request from the specific registrar and to store the acquisition request in the acquisition database. Also, an acquisition engine can be integrated with a registry system to receive from the registry system a pending delete notification for the domain name. The acquisition engine can be integrated as hardware, software, or both. The pending delete notification can precede a public delete notification issued by the registry system. The acquisition engine can then access the acquisition request from the acquisition database and request acquisition of the domain name for the specific registrar.

The domain name monitoring and acquisition services and system described herein can be offered as a viable, independent business tool. Primary customers of a business employing the present invention would be domain name registrars and resellers (such as in a thick registry system). In this capacity, the registrars essentially would be reselling the services to their customers so as to provide the customers a more reliable way to acquire a newly available domain name. Fees could be charged for placing an acquisition request.

Additional aspects and advantages of this invention will be apparent from the following detailed description of preferred embodiments thereof, which proceeds with reference to the accompanying drawings.

DETAILED DESCRIPTION OF THE PREFERRED EMBODIMENTS

Figure 1:
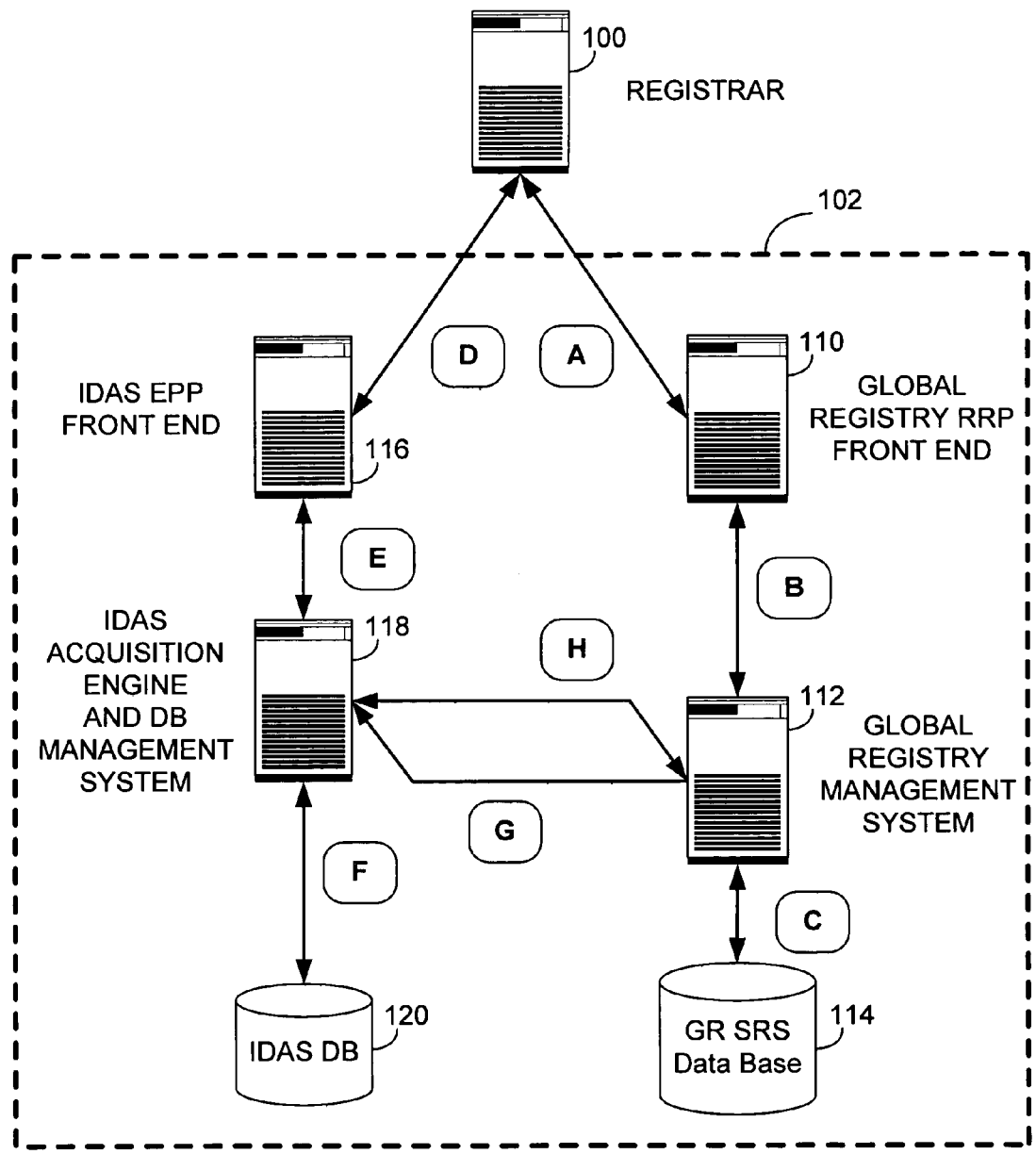
FIG. 1 is a simplified block diagram of a domain name management and acquisition system according to the present invention.

When referring to the following in FIG. 1, the term "systems" is meant to mean one or more, routers, layer two or three switches, computer systems, APIs, and software. In FIG. 1, a Registrar computer 100 communicates with a Registry system 102. The Registry system includes a Global Registry RRP front end 110. The front end 110 communicates with a Global Registry SRS Database Management System 112. The SRS database itself is illustrated as 114. This database would be the unique global ("authoritative") database for the gTLD space assigned to the Registry system 102 operator (e.g., ".com").

For ease of discussion, a preferred embodiment of the present invention is described in terms of a system integrated at the registry level. This system is described as receiving input from one or more registrars. As will be readily apparent to those of skill in the pertinent art, a system consistent with the present invention can be integrated with the registry as hardware, software, or both. Similarly, the present system can operate in a thick registry system (in addition to a thin registry system) by receiving input directly from potential registrants, rather than from a registrar. These alternative embodiments are equally within the scope of the present invention as set out in the attached claims.

The Registrar 100 also communicates with an Integrated Domain Acquisition Service ("IDAS") front end computer 116. This computer can implement appropriate communications protocols (many of which are known; with various levels of security), including, for example "Extensible Provisioning Protocol" (EPP). EPP is a connection-oriented, application layer client-server protocol for provisioning and management of objects stored in a shared central repository. It employs the XML schema semantics for domain name related queries to the repository.

The front end computer 116 is coupled to an Integrated Domain Acquisition Service ("IDAS") acquisition engine and database management system 118. The acquisition system, in turn, communicates with an Integrated Domain Acquisition Service ("IDAS") database 120. The various elements of the system 102 can of course be implemented in various ways, using more or fewer computers than illustrated in a distributed network. One essential characteristic is that the system should be accessible by Registrar 100 at all times, and preferably accessible to many registrars. This is the primary function of the right side of the diagram, comprising the Global Registry front end 110, the Global Registry database management system 112, and the Global Registry SRS database 114.

The elements on the left side of the diagram implement an Integrated Domain Acquisition Service ("IDAS"). Here "integrated" refers to integration with the global registry as further explained below. In the past, domain name acquisition services were provided by registrars or other parties using their own systems, separate and remote from the global registry. We also use the phrase "domain acquisition services" to refer to services distinct from the routine registration of an available domain name. In particular, we use the phrase "domain acquisition services" to mean "acquiring" (by reserving, holding or substantially immediately registering) a domain name that had been registered, and recently became newly available, generally because the prior registrant did not timely extend (renew) the registration.

FIG. 1 illustrates the following data paths:

"A" The current (typically SSL) RRP communications channel connecting the Registrar 100 to the Registry System 102 via the global registry RRP front end 110.

"B" Any communications paths between the RRP front end 110 and the database processing environment 112 for the Shared Registration System.

"C" Any communications paths between the Global Registry Management System 112 for the Shared Registration System and the actual SRS database 114.

"D" The (preferably SSL EPP) communications channel connecting the Registrar 100 to the IDAS front end 116.

"E" A communications channel connecting the IDAS front end 116 to the IDAS acquisition engine and database management system 118.

"F" A communications channel connecting the IDAS Acquisition Engine and Database Management System 118 to the IDAS database 120.

"G" A communications channel from the Global Registry Management System 112 enabling notification of deleting domains to the IDAS Acquisition Engine and database management system 118.

"H" A communications channel between the Global Registry SRS database Management System 112 and the IIDAS Acquisition Engine and database management system 118.

These links implement the necessary access to the Global Registry Management System (112) to issue commands needed to register desired domains on a Registrar's behalf. "Desired domains" are the names stored in database 120 to be monitored and acquired if and when available. Commands for this channel preferably should include RRP "check domain," RRP "add domain," RRP "modify domain commands," and possibly other commands necessary to modify the SRS Registrar field.

Figure 2:
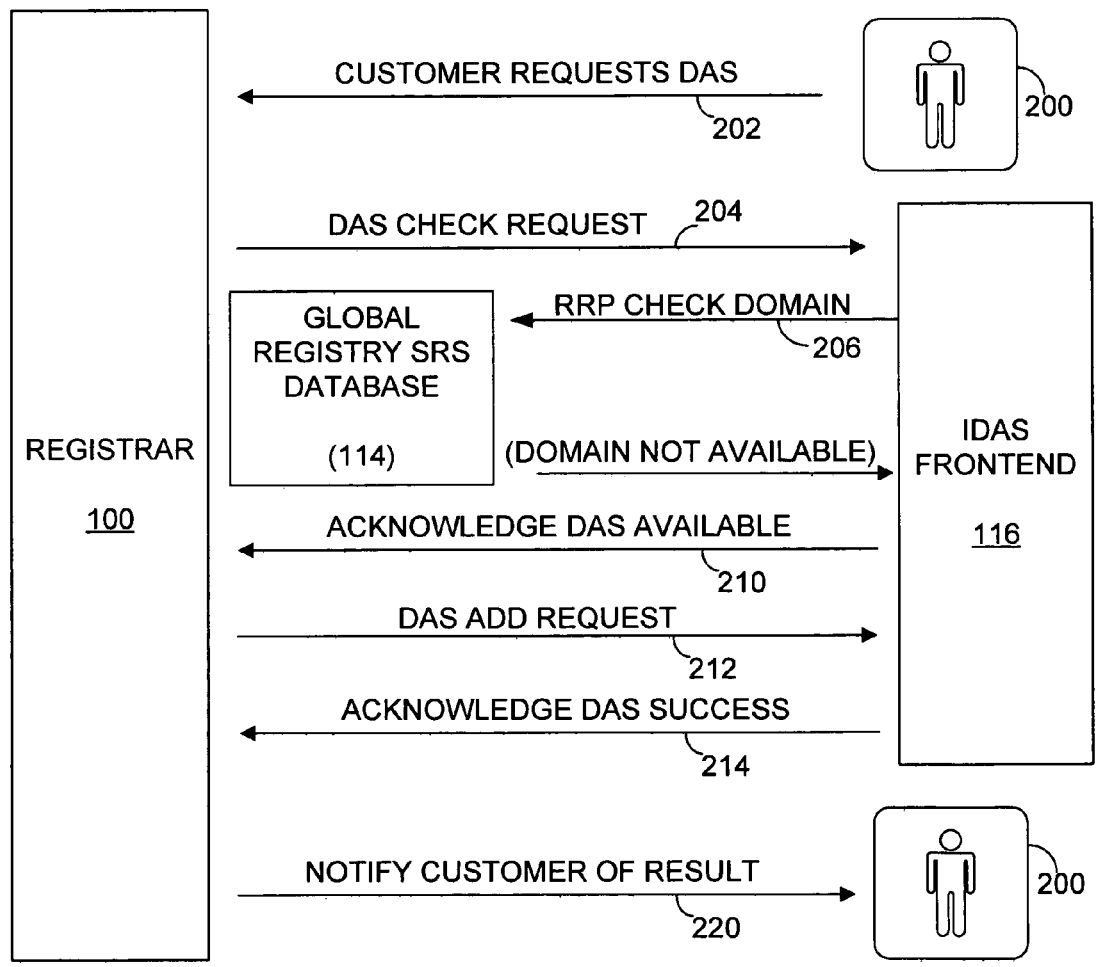
FIG. 2 illustrates a procedure for a registrar to obtain domain name acquisition services for a customer consistent with the present invention.

FIG. 2, which illustrates a procedure for a Registrar to obtain a IDAS subscription, is as follows. A customer 200 makes a request 202 to a Registrar 100 for DAS service. In a presently preferred embodiment, the Registrar establishes an EPP or similar connection to the IDAS front end and issues a "DAS check request" 204. Responsive to the "DAS check request" the IDAS Frontend 116 will query the Global Registry SRS Database 114 ("RRP Check Domain" 206) for the current SRS status of the second level domain name (SLD). If the domain name is currently registered, signified by a message 210, it is eligible for a DAS subscription. The Registrar can then issue a valid "DAS add request" 212. The front end 116 causes an appropriate entry in the IDAS database (see FIG. 1). When the requested domain name becomes available, the IDAS system sends an "Acknowledge DAS Success" or similar message 214 to the Registrar that requested the service. That registrar then notifies its customer 200 shown as message 220, typically via email.

The "DAS Add Request" 212 requires the Registrar to populate a data set, for example, through the EPP interface, with information previously supplied by the requesting customer 200. This information is a data escrow containing the required registration information for the desired domain name. The data set also contains flag fields indicating who will provide the email notifications, the intermediary or the Registrar. At any time during the DAS subscription period, the Registrar can update or modify the registration information in the DAS database. Once the desired registration occurs, the Registrar, and optionally one or more customer defined e-mail addresses, will receive notification by e-mail of the successful operation. Other methods of customer notification can be used (e.g. fax, wireless, pager, vm, voicemail, snail mail, etc.); the method is not critical. Upon receiving the notification 214 the Registrar will update 332 the WHOIS record 340 reflecting the new registrant information originally supplied from the DAS database 120.

Once a Registrar has issued a successful "monitor and acquire service add command," information about the monitor and acquire service is stored in the IDAS database. Fields in the monitor and acquire service database will include the SLD and TLD, the sponsoring Registrar for the future domain name registration, complete registrant and contact information, from one to thirteen name servers, date of the monitor and acquire service subscription creation, date of the monitor and acquire service subscription expiration, a status field indicating that the intermediary will perform customer notification, up to three e-mail notification addresses, and the status of the monitor and acquire service (pending or complete).

Figure 3:
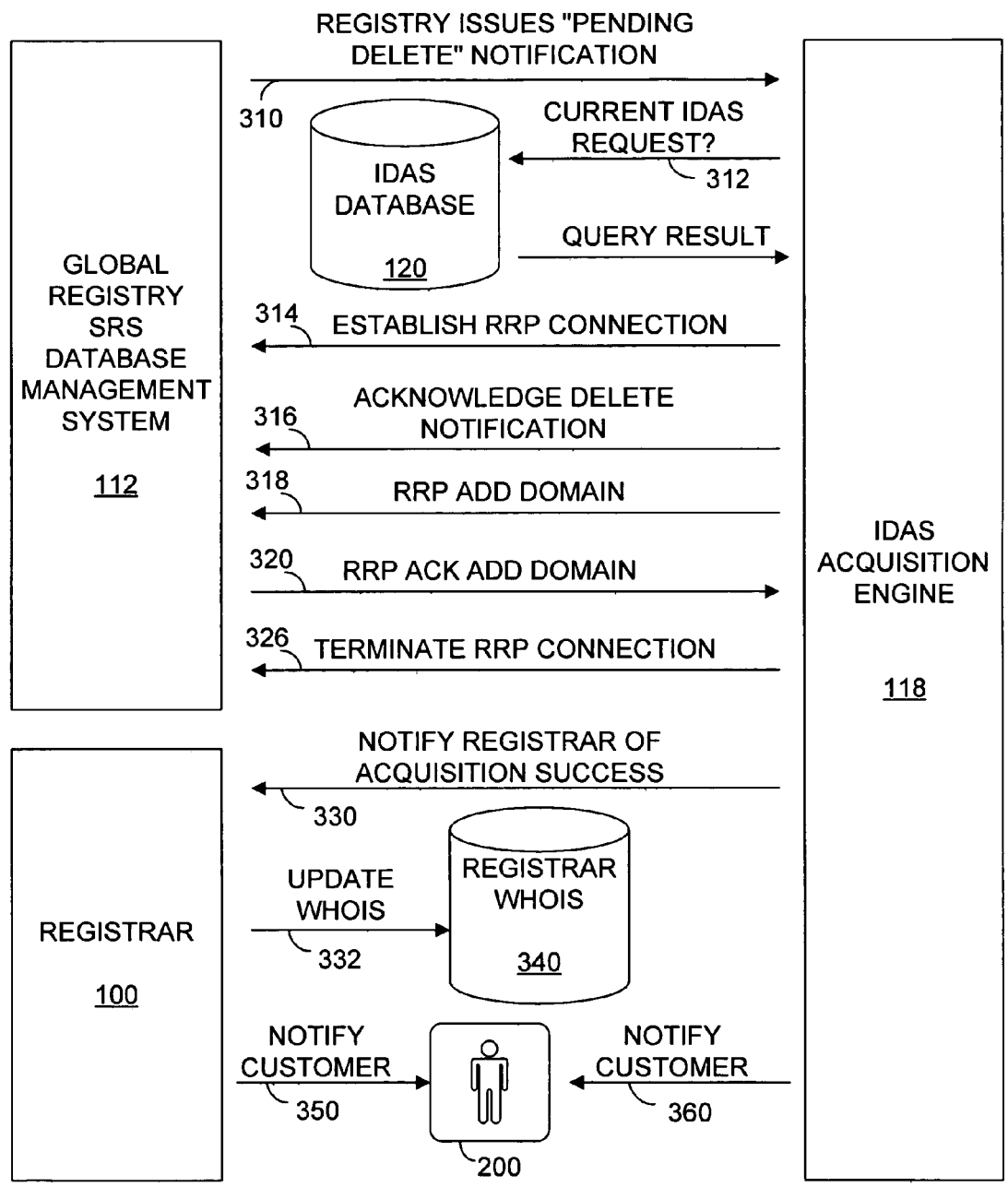
FIG. 3 is a schematic of the various communications and interactions between domain name acquisition engine, a registrar, and a registry according to the present invention.

FIG. 3 depicts communications and interactions between the Registry and the intermediary's Acquisition Engine. In a prompt and preferably real time manner, the Registry 112 will transmit a message 310 to the IDAS Acquisition Engine 118 indicating that a domain name is ready to be released and will be in a state where it can be re-registered. This is shown as a "pending delete" notification 310. These messages are not necessarily the Registrar's RRP delete commands, but follow the Registrar's RRP delete command when the Registry is about to initiate a final purge process making the domain name available for re-registration.

Responsive to a "pending delete notification" message to the IDAS Acquisition Engine, the Acquisition Engine checks the domain name 312 against the monitor and acquire service subscription database 120. If an IDAS subscription is held on the domain name, the Acquisition Engine will establish an RRP connection 314 on the Registrar's behalf. This connection or message corresponds to channel "H" as illustrated in FIG. 1. Next, the Acquisition Engine acknowledges receipt 316 of the original ("pending delete") message to the Global Registry system 112 and the Registry completes a purge of the subject domain name. Now the Acquisition Engine issues an RRP "add domain" command 318 to re-register the domain name (to the new registrant, customer 200).

If an IDAS subscription does not exist in the IDAS database for the domain name identified in the "pending delete" notification, the Acquisition Engine simply replies with an acknowledgement 316 to the Registry, and purging of the name proceeds. No attempt to register the domain name is made by the Acquisition Engine. All registrars, including registrars other than 100, will learn of the deletion when they next update their records against the SRS database, and are free to register the purged name in the conventional manner. As may be observed in view of this description, no registrar will beat registrar 100 in registering the newly released name, as registrar 100 is using the DAS system integrated with the registry itself.

Referring again to FIG. 3, once a successful RRP add domain name command has been issued, the Registrar will receive notification 330 of the desired registration. The Registrar will then update 332 its WHOIS database 340 by modifying the record corresponding to the name just re-registered. The registrar can notify 350 the customer 200 or, alternatively, the option can be implemented to have the IDAS effect the customer notification 360. If the acquisition system is employed in a thick registry domain name system, the registry provides the WHOIS update 332 to a registry WHOIS database (not shown) as opposed to the registrar WHOIS database 340.

Figure 4:
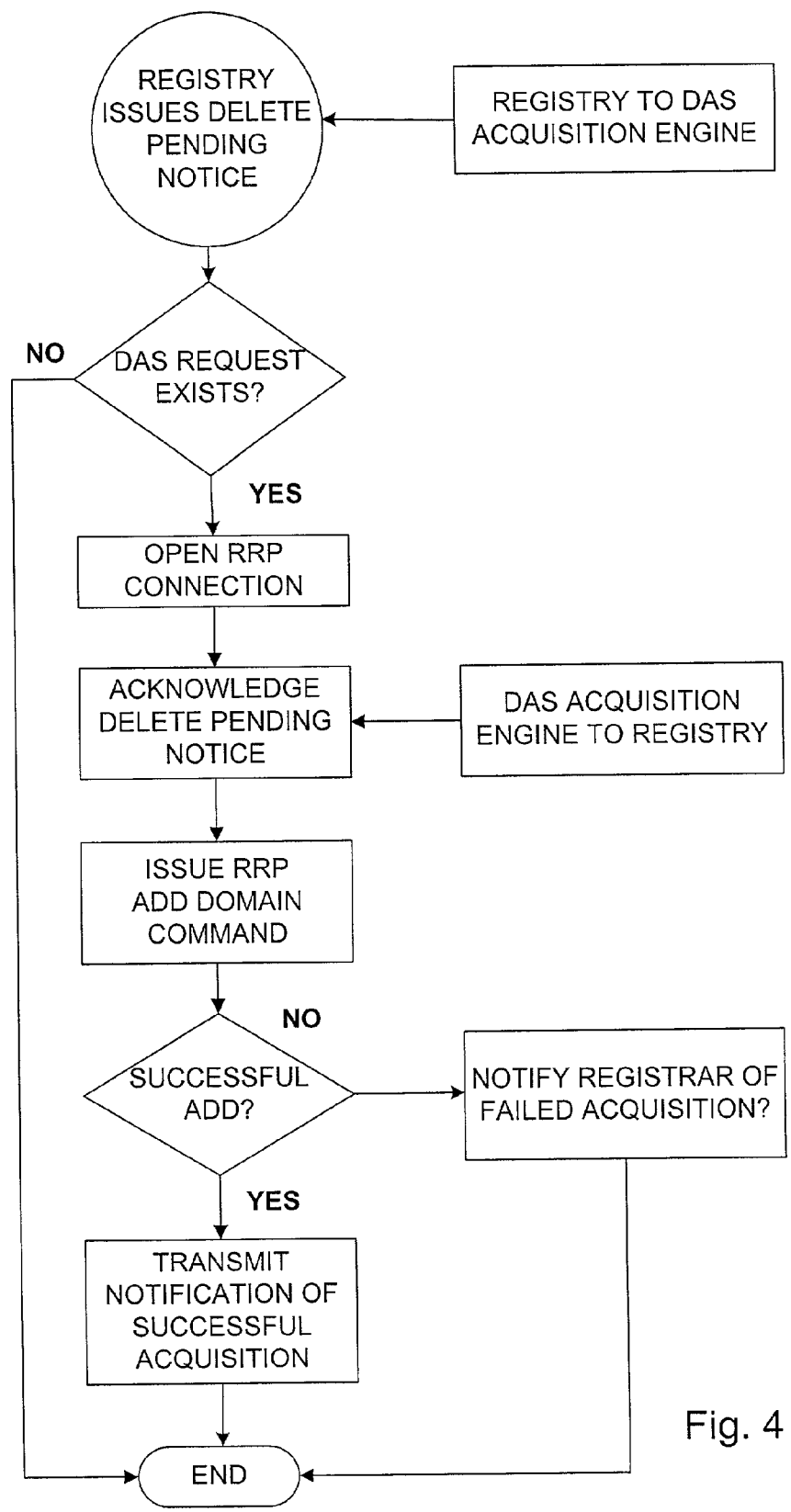
FIG. 4 is a flow diagram providing a logic overview of the process of FIG. 3.

FIG. 4 is a flow diagram providing a logic overview of the processes described above. It illustrates the foregoing processes in an alternative format, but it need not be separately described further.

It will be obvious to those having skill in the art that many changes may be made to the details of the above-described embodiments of this invention without departing from the underlying principles thereof. The scope of the present invention should, therefore, be determined only by the following claims.

The invention claimed is:

1. A domain name registry system comprising:
   a registry database containing a current registration record for a domain name, the current registration record having an expiration date;
   a registry management system, having access to the registry database, to delete the current registration record after the expiration date, to issue a public delete notification, and to add a new registration record for the domain name;
   a single acquisition database containing an acquisition request from a specific registrar to acquire the domain name as soon as practicable following the expiration date and preceding the public delete notification; and
   an acquisition engine to receive from the registry management system a pending delete notification, the pending delete notification preceding the public delete notification, to access the acquisition request from the acquisition database, and to request the registry management system to add the new registration for the specific registrar before the registry management system purges the desired domain name.

2. The system of claim 1 further comprising an acquisition front end to receive the acquisition request from the specific registrar and to store the acquisition request in the acquisition database.

3. The system of claim 2 wherein the acquisition front end is a Web server, and further comprising a Web page hosted by the Web server to receive the acquisition request from the specific registrar.

4. An integrated domain name acquisition system comprising:
   an acquisition database containing an acquisition request from a specific registrar to acquire a domain name as soon as practicable to follow a preceding registration for the domain name;
   an acquisition front end system to receive the acquisition request from the specific registrar and to store the acquisition request in the acquisition database; and
   an acquisition engine integrated with a registry system to receive from the registry system a pending delete notification for the domain name, the pending delete notification preceding a public delete notification, to access the acquisition request from the acquisition database, and to request acquisition of the domain name for the specific registrar before the registry system purges the desired domain name.

5. The system of claim 4 wherein the acquisition of the domain name is a registration of the domain name.

6. A method for acquiring a soon-to-delete domain name, the method comprising the steps of:
   receiving from a registrar a request to acquire a desired domain name;
   receiving from a registry a pending delete notification for the desired domain name, the pending delete notification preceding a public delete notification; and
   responsive to the received pending delete notification, requesting acquisition of the desired domain name for the registrar before the registry purges the soon-to-delete domain name.

7. The method of claim 6, wherein the acquisition is a succeeding registration for the desired domain name.

8. The method of claim 6, wherein the acquisition includes placing the desired domain name on registration hold.

9. A method of domain name acquisition comprising:
  receiving from a registrar a request to acquire a desired domain name;
  storing the request in a database;
  receiving from a registry system a pending delete notification for the desired domain name, the pending delete notification preceding a public delete notification, the pending delete notification being received before the registry system purges the desired domain name;
  correlating the pending delete notification to the request stored in the database; and
  requesting acquisition of the desired domain name for the registrar before the registry system purges the desired domain name.

10. The method of claim 9 further comprising the steps of, prior to the requesting acquisition step:
  acknowledging to the registry system receipt of the pending delete notice; and
  receiving from the registry system notification that the desired domain name has been deleted.

11. A method for domain name management comprising the steps of:
  receiving from an interested entity an expression of interest in a currently registered domain name on behalf of a new registrant;
  storing the expression of interest;
  detecting that the domain name registration has expired; and
  prior to deletion of the expired domain name registration from the registry, and prior to a public delete notification, requesting a new registration of the domain name in the name of the new registrant to succeed the expired domain name registration.

12. The method of claim 11 and further comprising the step of auctioning the new registration among interested entities.

13. The method of claim 11 wherein said detecting step comprises receiving a delete pending notification from the registry.

14. The method of claim 11 wherein the request to monitor the domain name registration is received from a registrar.

15. The method of claim 11 wherein the request to monitor the domain name registration is received from a registrar on behalf of its customer.

16. The method of claim 11 wherein the step of requesting a new registration is triggered by electronic notification from the registry that deletion of the domain name is pending.

17. A method for domain name management comprising the steps of:
  receiving from an interested entity a request to monitor a domain name registration maintained by a registry;
  monitoring a current status of the domain name registration;
  detecting that the domain name registration has expired; and
  prior to deletion from the registry, and prior to a public delete notification, requesting a new registration of the domain name to succeed the expired domain name registration.

18. The method of claim 17 wherein said monitoring the current status of the registration includes establishing a link into the registry.

19. The method of claim 17 wherein said monitoring the current status of the registration includes receiving updates from the registry.

20. The method of claim 17 wherein said monitoring the current status of the registration includes effecting queries into the registry database.

* * * * *

UNITED STATES PATENT AND TRADEMARK OFFICE
CERTIFICATE OF CORRECTION

| | | |
|---|---|---|
| PATENT NO. | : 7,039,697 B2 | |
| APPLICATION NO. | : 10/016498 | |
| DATED | : May 2, 2006 | |
| INVENTOR(S) | : Len Albert Bayles and Raymond King | |

It is certified that error appears in the above-identified patent and that said Letters Patent is hereby corrected as shown below:

At [12], after "Bayles", add -- et al.--.

At [75], after "(US)", add --and Raymond King, Portland, OR (US)--.

In Column 3, Line 21, replace "Verisign" with --VeriSign--.

In Column 3, Line 22, replace "org" with --.org--.

In Column 3, Line 42, replace ".com" with --.com,--.

In Column 3, Line 43, replace "org" with --.org--.

In Column 4, Line 33, replace "Verisign" with --VeriSign--.

In Column 4, Line 36, replace "Verisign" with --VeriSign--.

In Column 6, Line 48, after "between", insert -- a--.

In Column 8, Line 10, replace "IIDAS" with --IDAS--.

In Column 8, Line 24, replace "a" with --an--.

In Column 8, Line 61, replace "add command,"" with --add" command,--.

In Column 9, Line 38, replace "leam" with --learn--.

Signed and Sealed this

Fifteenth Day of August, 2006

JON W. DUDAS
*Director of the United States Patent and Trademark Office*